United States Patent
Yin

(10) Patent No.: US 8,106,975 B2
(45) Date of Patent: Jan. 31, 2012

(54) ANALOG DARK AVERAGE CIRCUIT AND METHOD FOR AN IMAGE SENSOR

(75) Inventor: Ping-Hung Yin, Tainan (TW)

(73) Assignee: Himax Imaging, Inc., Grand Cayman (KY)

( * ) Notice: Subject to any disclaimer, the term of this patent is extended or adjusted under 35 U.S.C. 154(b) by 448 days.

(21) Appl. No.: 12/425,341

(22) Filed: Apr. 16, 2009

(65) Prior Publication Data

US 2010/0265368 A1     Oct. 21, 2010

(51) Int. Cl.
*H04N 9/64* (2006.01)
(52) U.S. Cl. ......... 348/243; 348/241; 348/302; 348/308
(58) Field of Classification Search ............... 348/222.1, 348/241–252, 294, 308, 311, 302–304
See application file for complete search history.

(56) References Cited

U.S. PATENT DOCUMENTS

2005/0195645 A1* 9/2005 Panicacci et al. ............. 365/156
2007/0063128 A1* 3/2007 Krymski ..................... 250/208.1

* cited by examiner

*Primary Examiner* — Huy K Mai
(74) *Attorney, Agent, or Firm* — Stout, Uxa, Buyan & Mullins, LLP

(57) ABSTRACT

An analog dark-signal averaging circuit and method for an image sensor are disclosed. Each sub-circuit of the dark-signal averaging circuit correspondingly inputs a signal from a pixel circuit of the image sensor, and each sub-circuit includes a correlated double sampling (CDS) circuit. The capacitors of the sub-circuits are controllably coupled by average switches, thereby averaging the reset signals and the image signals among the black pixels.

7 Claims, 3 Drawing Sheets

ANALOG DARK AVERAGE CIRCUIT AND METHOD FOR AN IMAGE SENSOR

BACKGROUND OF THE INVENTION

1. Field of the Invention

The present invention generally relates to the black (or dark) level calibration (BLC) for an image sensor, and more particularly to an analog dark-signal averaging (dark average) circuit and method for the image sensor.

2. Description of Related Art

Semiconductor based image sensors such as charge-coupled devices (CCDs) or complementary metal-oxide-semiconductor (CMOS) sensors are widely used, for example, in cameras or camcorders, to convert images of visible light into electronic signals that can then be stored, transmitted or displayed.

Due to the imperfectness of electronic circuitry, leakage current (or dark signal) exists even when no light is received by the image sensor. This unwanted dark signal is accumulated along with a desired data signal, and, for the worse, the dark signal is indistinguishable from the data signal. The accumulated dark signal consumes image dynamic range and reduces image contrast, and thus degrades image quality. In order to suppress or correct the dark signal, a black (or dark) level calibration (BLC) is thus needed. In the BLC operation, dark signals of one or more light-shielded pixels are collected as a black or dark level reference, which is then subtracted from the integrated signal, therefore improving the image quality.

Digital domain BLC is one of the conventional methods used to calibrate the black or dark level in an image sensor. FIG. 1 shows a conventional digital BLC system. Specifically, light-shielded pixels are amplified by a programmable gain amplifier (PGA) 11 and then converted into digital equivalents by an analog-to-digital converter (ADC) 12. The digital outputs of the ADC 12 are averaged by a digital circuit, such as a digital signal processor (DSP) 14. The averaged output is then converted back to an analog equivalent by a digital-to-analog converter (DAC) 16, and is then used to compensate the PGA 11. The conventional digital BLC system needs to obtain the statistical value of the dark level before feeding back the dark level to perform the calibration. Due to the nature of the dark level statistics in the digital domain, a lot of time is involved in obtaining the statistical dark level. Therefore, the number of the frames per second is greatly limited, and the video rate thus falls. Moreover, the performance of the digital BLC becomes worse when a fault pixel or pixels, such as hot pixels, exist in the image sensor.

For the reason that conventional BLC methods, particularly the digital domain BLC, cannot quickly calibrate the dark level for the image sensor, a need has thus arisen to propose a novel scheme to quickly and effectively obtain the dark level for performing the BLC.

SUMMARY OF THE INVENTION

In view of the foregoing, it is an object of the present invention to provide an analog (domain) dark-signal averaging (dark average) circuit and method for quickly and effectively obtaining a black or dark level in an image sensor for performing black (or dark) level calibration (BLC). A further object of the present invention is to reduce the impact of a fault pixel or pixels (such as hot pixels) on the BLC.

According to one aspect of the present invention, each sub-circuit of the dark-signal averaging circuit correspondingly inputs a signal from a pixel circuit of the image sensor, and each sub-circuit includes a correlated double sampling (CDS) circuit. Capacitors of the sub-circuits are controllably coupled by average switches, thereby averaging the reset signals and the image signals among the light-shielded or black pixels.

According to another aspect of the present invention, the reset signals of black pixels are sampled and held, and the image signals of the black pixels are then sampled and held. Subsequently, the held reset signals among the black pixels are averaged, and the held image signals among the black pixels are averaged.

DETAILED DESCRIPTION OF THE INVENTION

Figure 1:
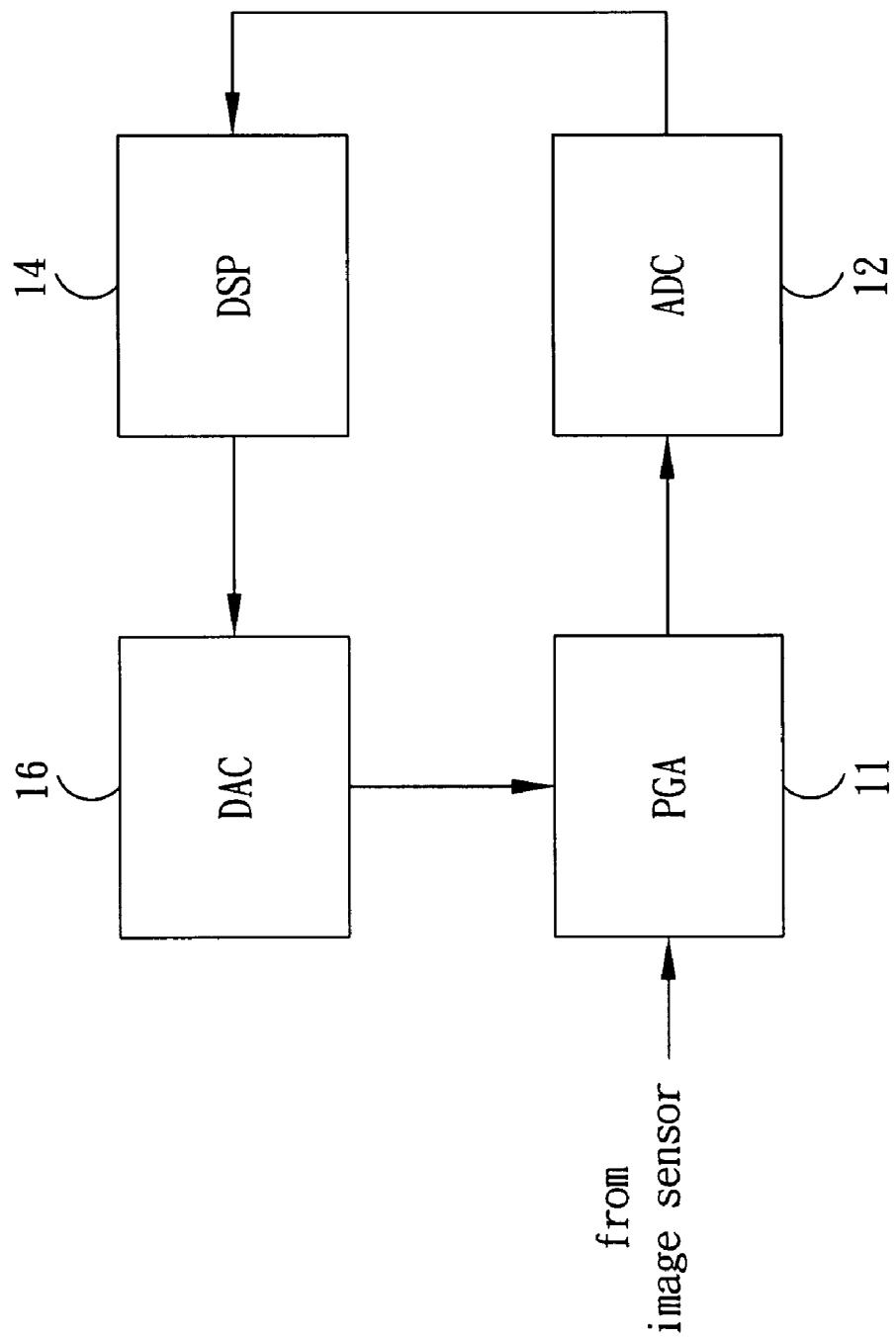
FIG. 1 shows a conventional digital black level calibration (BLC) system.
Figure 2:
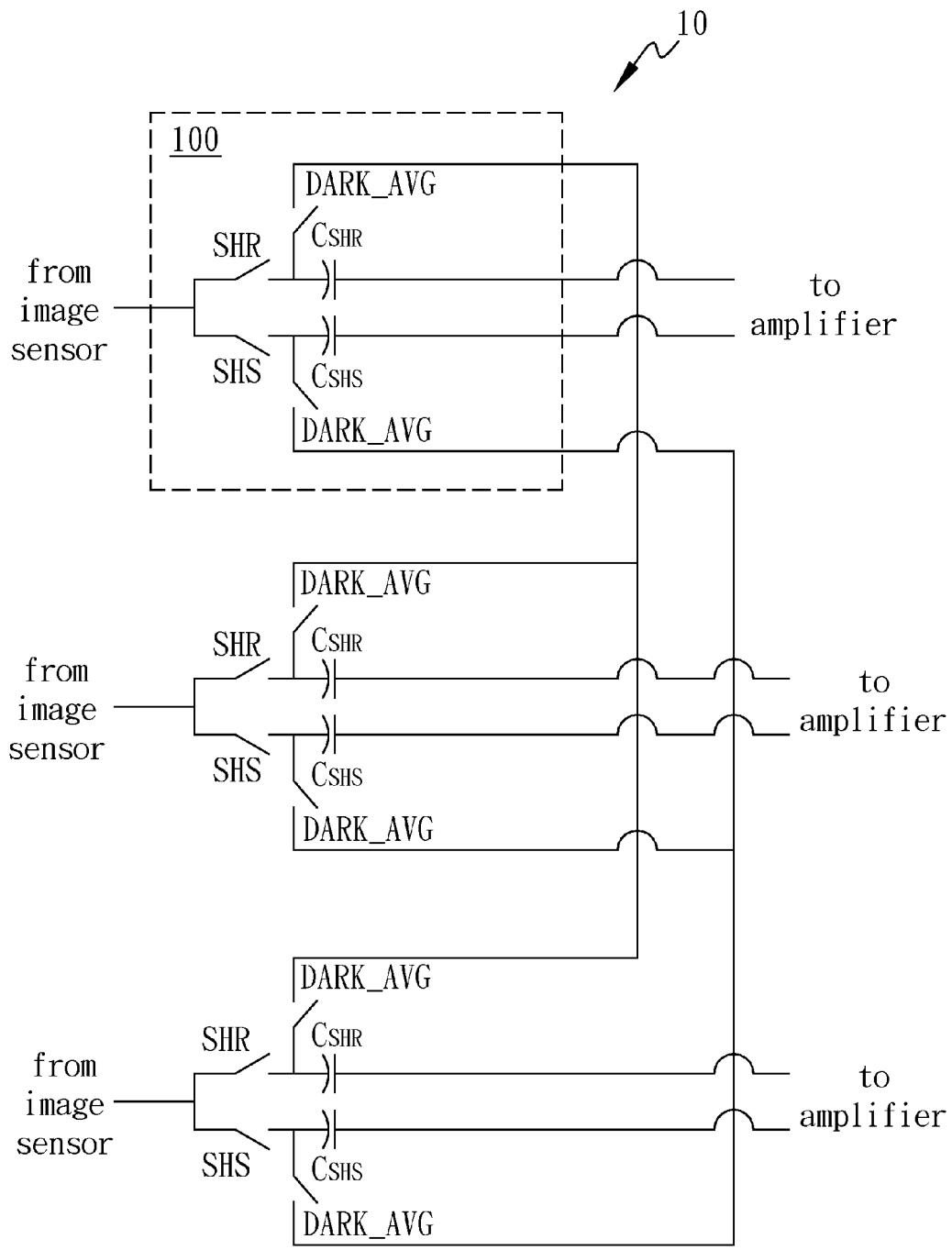
FIG. 2 shows circuitry of an analog dark-signal averaging (dark average) circuit for an image sensor according to one embodiment of the present invention.
Figure 3A:
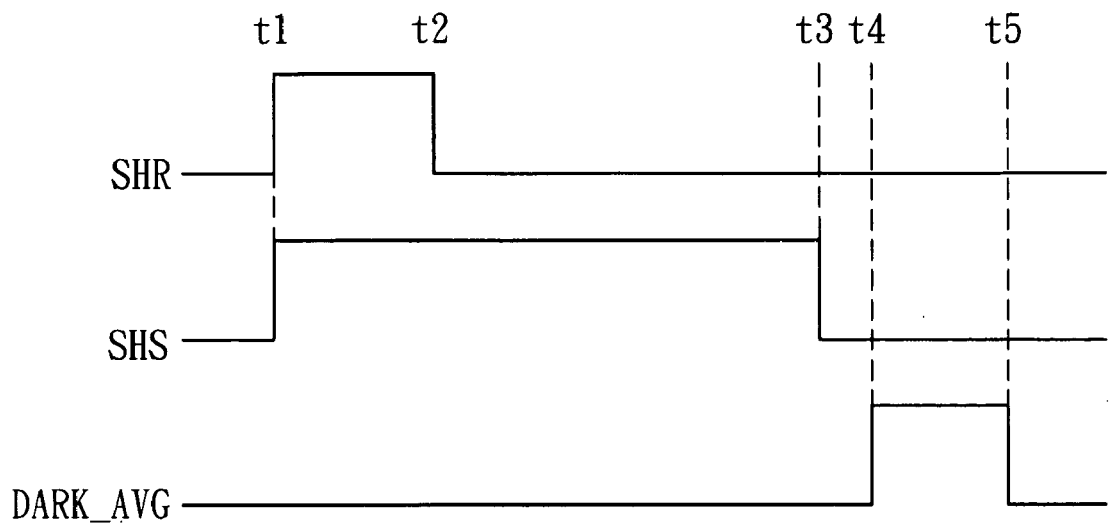
FIG. 3A shows a timing diagram of corresponding signals in FIG. 2.
Figure 3B:
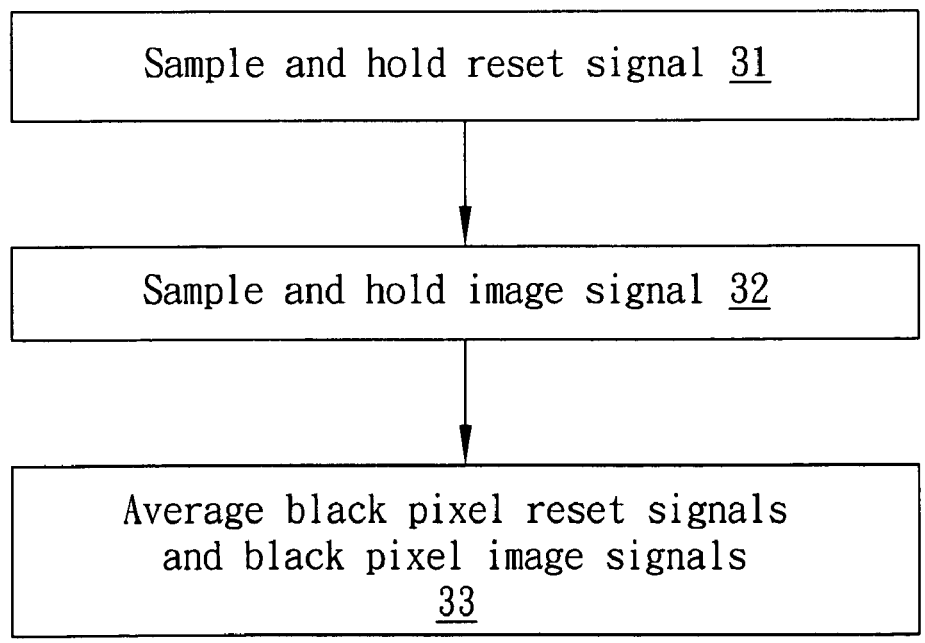
FIG. 3B is a flow diagram illustrative of the steps of an analog dark-signal averaging method according to the embodiment of the present invention.

FIG. 2 shows circuitry of an analog dark-signal averaging (dark average) circuit 10 for an image sensor according to one embodiment of the present invention. In the figure, the transistors (or the switches) and the associated control signals use the same reference characters. FIG. 3A shows a timing diagram of corresponding signals in FIG. 2, and FIG. 3B is a flow diagram illustrative of the steps of an analog dark-signal averaging method according to the embodiment of the present invention. The disclosed analog dark-signal averaging circuit 10 may be generally applied to a digital image processing device, such as, but not limited to, a camera or camcorder. The image sensor is a semiconductor based image sensor, such as, but not limited to, a charge-coupled device (CCD) or a complementary metal-oxide-semiconductor (CMOS) sensor, using, for example, pixel circuits to convert images of visible light into electronic signals.

The dark-signal averaging circuit 10 includes a number of sub-circuits 100 (three representative sub-circuits of which are shown in the figure), each correspondingly inputting a signal from one of the pixel circuits of the image sensor. Ordinarily, the signals are amplified, for example, by a column amplifier (CA) before entering into the dark-signal averaging circuit 10. The outputs of the dark-signal averaging circuit 10 are ordinarily amplified by a following amplifier, such as a programmable gain amplifier (PGA), which is usually followed by digital circuitry, such as an analog-to-digital converter (ADC) and/or digital signal processor. As the signals in the dark-signal averaging circuit 10 are processed in the analog domain, the circuit 10 is thus named as an "analog" dark-signal averaging circuit.

In the embodiment, each sub-circuit 100 includes a correlated double sampling (CDS) circuit, which includes a sample-and-hold-reset_signal (SHR) switch controlled under a SHR control signal and a sample-and-hold-image_signal (SHS) switch controlled under a SHS control signal. The SHR switch and the SHS switch are coupled to a SHR capacitor $C_{SHR}$ and a SHS capacitor $C_{SHS}$ respectively. The SHR capacitors $C_{SHR}$ of all (or some) sub-circuits 100 of the analog dark-signal averaging circuit 10 are electrically coupled through average switches DARK_AVG, which are controlled under dark-average control signal (DARK_AVG). Specifically, the interconnecting nodes between the SHR switches and the SHR capacitors $C_{SHR}$ are controllably communicated to each other. Accordingly, the SHR capacitors $C_{SHR}$ of all (or some) sub-circuits 100 are electrically coupled when the average switches DARK_AVG are closed. As used herein, the term "electrically coupled" means that nodes or elements are directly connected by a conductive wire, or are indirectly connected through other electronic elements. Likewise, the SHS capacitors $C_{SHS}$ of all (or some) sub-circuits 100 of the analog dark-signal averaging circuit 10 are also electrically coupled through average switches DARK_AVG, which are controlled under dark-average control signal (DARK_AVG). Specifically, the interconnecting nodes between the SHS switches and the SHS capacitors $C_{SHS}$ are controllably communicated to each other. Accordingly, the SHS capacitors $C_{SHS}$ of all (or some) sub-circuits 100 are electrically coupled when the average switches DARK_AVG are closed.

In the BLC operation, during a resetting period (for example, t1 to t2 in FIG. 3A), the SHR switch is closed such that the reset signal of light-shielded or black pixel(s) is sampled and held in the SHR capacitor $C_{SHR}$ (in step 31). During an integrating period (for example, t2 to t3 in FIG. 3A), the SHS switch is closed such that the image signal of the light-shielded pixel(s) is sampled and held in the SHS capacitor $C_{SHS}$ (in step 32). It is noted that the overlapping duration of the asserted SHR signal and the asserted SHS signal during t1 and t2 is in practice arranged to prevent a coupling effect in one embodiment. In an alternative embodiment, the SHS signal may be de-asserted during t1 and t2. After finishing the resetting and the integrating, the dark-average control signal (DARK_AVG) closes all average switches DARK_AVG, for example, during t4-t5 in FIG. 3A. As a result, the SHR capacitors $C_{SHR}$ of all sub-circuits 100 are electrically coupled together, thereby averaging all black pixel reset signals stored on the SHR capacitors $C_{SHR}$. Likewise, the SHS capacitors $C_{SHS}$ of all sub-circuits 100 are electrically coupled together, thereby averaging all black pixel image signals stored on the SHS capacitors $C_{SHS}$.

According to the embodiment, an average black or dark signal (level) may be obtained within a few clock cycles in the analog domain, in a way faster than the digital domain counterpart. Furthermore, the impact of the fault pixel or pixels (such as hot pixels) on the BLC can be substantially reduced through the analog dark-signal averaging circuit 10 and method of the present embodiment.

Although specific embodiments have been illustrated and described, it will be appreciated by those skilled in the art that various modifications may be made without departing from the scope of the present invention, which is intended to be limited solely by the appended claims.

What is claimed is:

1. An analog dark-signal averaging circuit for an image sensor, comprising:
    a plurality of sub-circuits, each correspondingly inputting signal from one of pixel circuits of the image sensor, wherein each sub-circuit includes a correlated double sampling (CDS) circuit having at least one capacitor, wherein each said sub-circuit samples and holds a reset signal of a black pixel during a resetting period, and each said sub-circuit samples and holds an image signal of the black pixel during an integrating period; and
    average switches for controlling the coupling among the capacitors of the sub-circuits to average the reset signals and the image signals among the black pixels of the sub-circuits, respectively;
    wherein an output of the average switches is used to perform black level calibration (BLC).

2. The analog dark-signal averaging circuit of claim 1, wherein the CDS circuit comprises:
    a sample-and-hold-reset_signal (SHR) switch controlled under a SHR control signal;
    a sample-and-hold-image_signal (SHS) switch controlled under a SHS control signal; and
    a SHR capacitor and a SHS capacitor coupled to the SHR switch and the SHS switch respectively.

3. The analog dark-signal averaging circuit of claim 2, wherein an interconnecting node between the SHR switch and the SHR capacitor of a sub-circuit is controllably communicated to another interconnecting node between the SHR switch and the SHR capacitor of another sub-circuit, under control of the average switch.

4. The analog dark-signal averaging circuit of claim 3, wherein an interconnecting node between the SHS switch and the SHS capacitor of a sub-circuit is controllably communicated to another interconnecting node between the SHS switch and the SHS capacitor of another sub-circuit, under control of the average switch.

5. An analog dark-signal averaging circuit for an image sensor, comprising:
    a plurality of sub-circuits, each correspondingly inputting signal from one of pixel circuits of the image sensor, wherein, each sub-circuit includes:
        a sample-and-hold-reset_signal (SHR) switch controlled under a SHR control signal;
        a sample-and-hold-image_signal (SHS) switch controlled under a SHS control signal; and
        a SHR capacitor and a SHS capacitor coupled to the SHR switch and the SHS switch respectively;
    and
    average switches for controlling the coupling among the SHR and the SHS capacitors of the sub-circuits;
    wherein each said sub-circuit samples and holds a reset signal of a black pixel during a resetting period, and each said sub-circuit samples and holds an image signal of the black pixel during an integrating period;
    wherein the average switches average the reset signals and the image signals among the black pixels of the sub-circuits, respectively; and
    wherein an output of the average switches is used to perform black level calibration (BLC).

6. The analog dark-signal averaging circuit of claim 5, wherein: an interconnecting node between the SHR switch and the SHR capacitor of a sub-circuit is controllably communicated to another interconnecting node between the SHR switch and the SHR capacitor of another sub-circuit, under control of the switch; and an interconnecting node between the SHS switch and the SHS capacitor of a sub-circuit is controllably communicated to another interconnecting node between the SHS switch and the SHS capacitor of another sub-circuit, under control of the average switch.

7. An analog dark-signal averaging method for an image sensor, comprising:
    sampling and holding reset signals of black pixels, wherein the reset signal is sampled by a sample-and-hold-reset_signal (SHR) switch, and is held in a SHR capacitor during a reset period;
    sampling and holding image signals of the black pixels, wherein the image signal is sampled by a sample-and-hold-image_signal (SHS) switch, and is held in a SHS capacitor during an integrating period; and
    averaging the reset signals among the black pixels, and averaging the image signals among the black pixels.

* * * * *